Fig. 1

Clarence W. Brandon
INVENTOR.

Clarence W. Brandon
INVENTOR.

Clarence W. Brandon
INVENTOR.

July 24, 1962 C. W. BRANDON 3,045,749
PIVOTING MEANS AND METHOD FOR PRODUCING PULSATING
WAVE BY AND ON FLUID PRESSURE DRIVES
Filed June 2, 1954 9 Sheets-Sheet 4

Clarence W. Brandon
INVENTOR.

BY *Clarence W. Brandon*
*and Harvey B. Jackson*
Attorneys

July 24, 1962 C. W. BRANDON 3,045,749
PIVOTING MEANS AND METHOD FOR PRODUCING PULSATING
WAVE BY AND ON FLUID PRESSURE DRIVES
Filed June 2, 1954 9 Sheets-Sheet 5

Clarence W. Brandon
INVENTOR.

BY *Clarence A. O'Brien*
*and Harvey B. Jacobson*
Attorneys

July 24, 1962

C. W. BRANDON 3,045,749

PIVOTING MEANS AND METHOD FOR PRODUCING PULSATING
WAVE BY AND ON FLUID PRESSURE DRIVES

Filed June 2, 1954

Clarence W. Brandon
INVENTOR.

BY Clarence A. O'Brien
and Harvey B. Jacobson
Attorneys

July 24, 1962 C. W. BRANDON 3,045,749
PIVOTING MEANS AND METHOD FOR PRODUCING PULSATING
WAVE BY AND ON FLUID PRESSURE DRIVES
Filed June 2, 1954 9 Sheets-Sheet 8

Clarence W. Brandon
INVENTOR.

BY *Clarence A. O'Brien*
*and Harvey B. Jacobson*
Attorneys

Clarence W. Brandon
INVENTOR.

United States Patent Office 3,045,749
Patented July 24, 1962

3,045,749
PIVOTING MEANS AND METHOD FOR PRODUCING PULSATING WAVE BY AND ON FLUID PRESSURE DRIVES
Clarence W. Brandon, 1806 Meridian Ave., Tallahassee, Fla., assignor of twelve and one-half percent to Orpha B. Brandon, Birmingham, Ala., five percent to Harvey B. Jacobson, Washington, D.C., and fifty percent to N. A. Hardin, Catherine H. Newton, and Hazel H. Wright, all of Forsyth, Ga.
Filed June 2, 1954, Ser. No. 433,965
14 Claims. (Cl. 166—42)

This invention comprises novel and useful improvements in a pivoting means and method for producing pulsating waves by and on fluid pressure drives, and more specifically relates to apparatuses and methods which are particularly adapted to apply a pressure drive to an oil bearing formation to facilitate secondary recovery of oil therefrom; and to improvements in the technique of producing such drives and applying the same.

The principal object of this invention is to provide a process and a means for producing pulsating pressures of the energy wave transmitting type in a fluid drive such as oil or water, for treating oil bearing formations to facilitate the secondary recovery of oil therefrom.

A further object of the invention is to provide a process and means in conformity with the preceding object in which the application of the pulsating pressure to the fluid drive and to the formation may be effected through a rotating pressure applying member, and wherein a circular zone of the formation shall be treated thereby in order to produce a spiralling pressure wave within the formation.

Yet another important object of the invention is to provide a process and means in conformity with the above mentioned objects wherein a periodic pulsating energy transmitting wave may be produced in a formation by applying to the formation pulsating pressures from a pressure drive fluid; and wherein at predetermined intermittent intervals an additional much higher frequency vibration or shock wave may be additionally applied to the fluid drive to produce an extremely heavy and efficient vibratory action upon a formation.

A still further important object of the invention is to provide a process and means as set forth in the preceding objects which may be easily and effectively applied and operated from within a well bore at any selected position therein.

Still another important object of the invention is to provide an apparatus as stated in the foregoing objects which shall be extremely sturdy and compact in its construction, and which will allow a circulation of the driving fluid through the device for applying pulsating pressures to formations; and will permit a return flow of the fluid through the device during the periods of reduced pressures in the pulsating cycle.

Another extremely important object of the invention is to provide an apparatus as set forth in the objects hereinbefore, in which additional high frequency vibrations may be imposed upon the fluid pressure drive at any selected intervals and in an improved manner and with but minor changes in the operation of the device.

Another object of the invention is to provide an apparatus and method in accordance with the foregoing objects wherein the rotation of the revolving pulsating pressure producing means shall be effected wholly or in part by the pressure of the fluid medium supplied thereto and/or wholly or in part by fluid pressure of the formation being treated.

A further object is to provide an apparatus and method whereby liquid and/or gases may be applied to a formation in accordance with the preceding objects.

Another object is to provide an apparatus having improved means for placing a pulsating wave generator and fluid medium distributor into good energy exchange relation with a formation.

An additional and more specific object of the invention is to provide an apparatus as set forth in the previous objects wherein a high frequency wave generating device may be selectively locked to a rotating fluid medium pulsating device for joint operation therewith; or may be locked to a stationary base for preventing operation of the wave generator.

A still further object and purpose is to provide an apparatus and process whereby a fluid medium may be alternately applied to and removed from a formation progressively along a circular path whereby fluid pressure pulsations are applied to the formation; and whereby additional series of pulsations of different frequencies and intensities may be applied to the fluid medium.

Yet another specific purpose is to provide in an apparatus for producing pulsations in a fluid medium, a combined means, rotated by the fluid medium passing therethrough, for periodically distributing fluid impulses to a formation, controllably applying high frequency pulsations to the fluid and controllably applying hammer shock waves to the fluid.

An important object is to provide a means for causing rotation of a fluid distributor by a fluid medium thereto and to directly apply the fluid by the distributor to a formation from portions of the distributor and to withdraw the applied fluid from the formation through other portions of the distributor.

A further object is to provide a fluid distributor rotor having a plurality of pairs of pivoted vanes, rotatable about their own axes by a surrounding fluid medium in which the distributor rotates, together with means to selectively lock the pivoted vanes against rotation upon their axes and to release them for such rotation.

A still further specific object is to provide in a pulsation producing means for fluids a rotor having vanes for producing rotation by passage of a fluid therethrough and whereby the vanes will pass the fluid going into a formation over the entire upper circumference of the rotor but will discharge the fluid from portion only of the lower circumference of the rotor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 6–10 are perspective views showing in their relative positions the various essential elements of this apparatus, and wherein—

*General Organization of the Embodiment of Figures 1–11*

Figure 1:
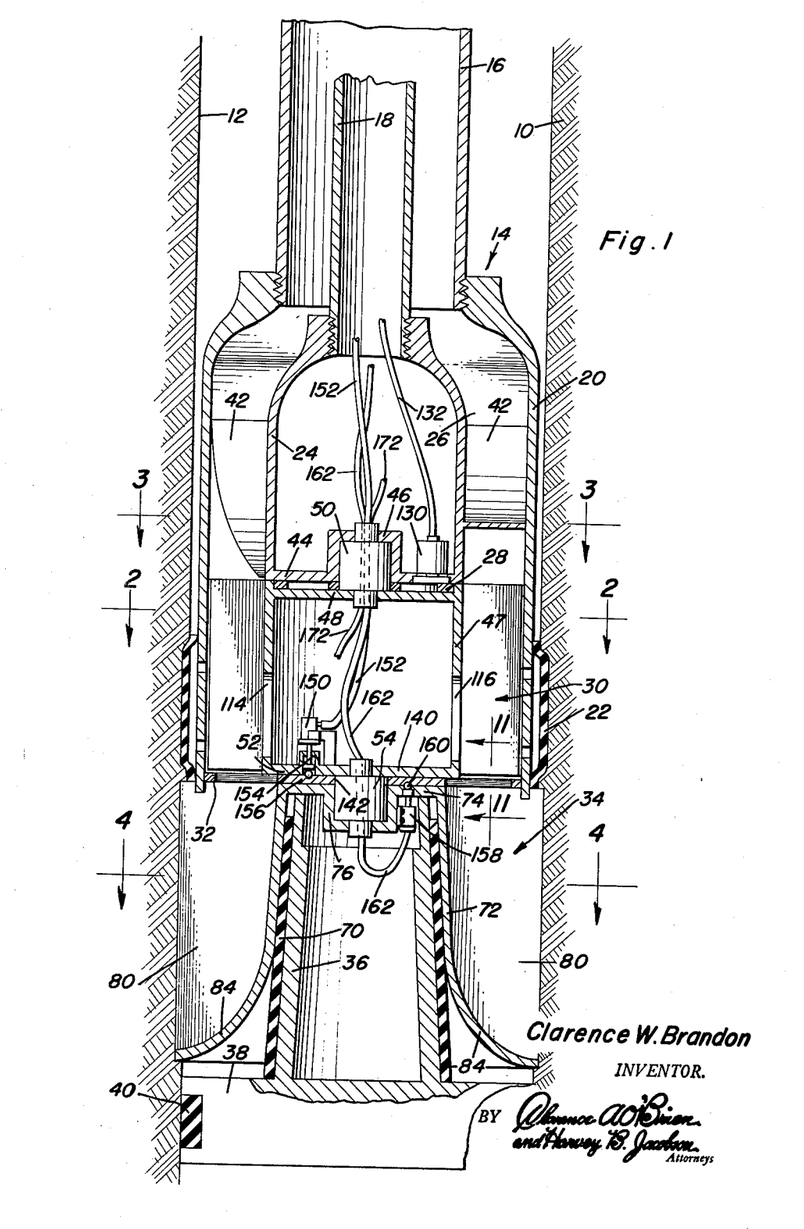
FIGURE 1 is a view in vertical central section through a preferred form of apparatus in accordance with this invention, certain concealed parts being indicated in dotted lines therein; the section being taken through the apparatus in a plane to illustrate the passage of the return flow of pressure fluid which has been previously applied to a formation and is returning therefrom through the apparatus.

Referring first to FIGURE 1 there is disclosed a portion of a formation 10, to be treated in accordance with this invention, which formation may comprise an oil bearing formation. In order to apply a pulsating fluid drive to this formation for treating the same, use is made of a well bore 12 of any desired character penetrating into the formation whereby access is had to a face of the formation. The novel apparatus forming the subject of this invention is designated generally by the numeral 14 and may be conveniently and readily introduced into and removed from the well bore in any desired manner, as for example by mounting the apparatus upon the lower end of a string of tubing 16 through which the fluid of the pressure drive is adapted to be supplied into the well bore and formation.

Disposed within the tubing 16 is a further string of tubing 18 which comprises a return line whereby the pressure drive fluid after being applied to the formation as set forth hereinafter, may be returned to the surface, it being intended to continuously recirculate the pressure drive fluid.

Figure 3:
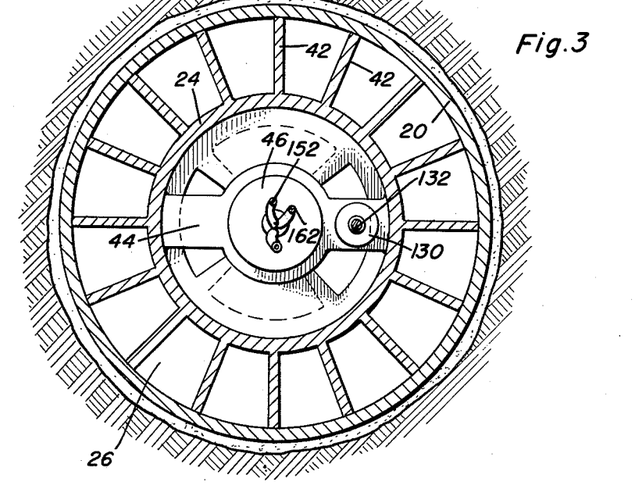
FIGURE 3 is a horizontal sectional view taken substantially upon the plane indicated by the section line 3—3 of FIGURE 1 and showing in particular the stationary turbine diffuser blade assembly for directing the pressure fluid from the turbine rotor of the device into the formation.
Figure 6:
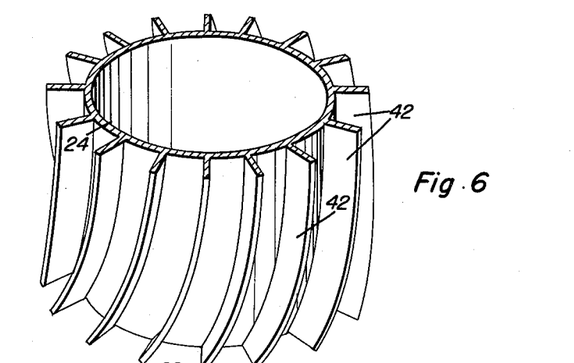
FIGURE 6 is a perspective view, the top portion of the same being shown in horizontal section, of the stationary diffuser vane assembly of the apparatus for directing the fluid pressure medium into the turbine rotor and distributor.

The apparatus 14 includes among its components a stationary outer casing 20 which is detachably secured as by screw threads to the lower end of the string of tubing 16, this casing enclosing certain of the elements composing the apparatus, and being provided upon its exterior and at its lower end with an expansible packer or anchor 22. Within the housing 20 is a centrally disposed stationary inner casing or housing 24. The housing 24 is removably secured by screw threads to the lower end of the string of tubing 18. The housings 20 and 24 are preferably equidistantly spaced and are cylindrical in shape in order to provide an annular chamber 26 therebetween, which chamber communicates with the interior of the tubing string 16. The member 24 upon its external surface carries a plurality of longitudinally extending circumferentially spaced diffuser vanes or fins 42 whose particular arrangement is shown in FIGURES 3 and 6.

Figures 7, 8:
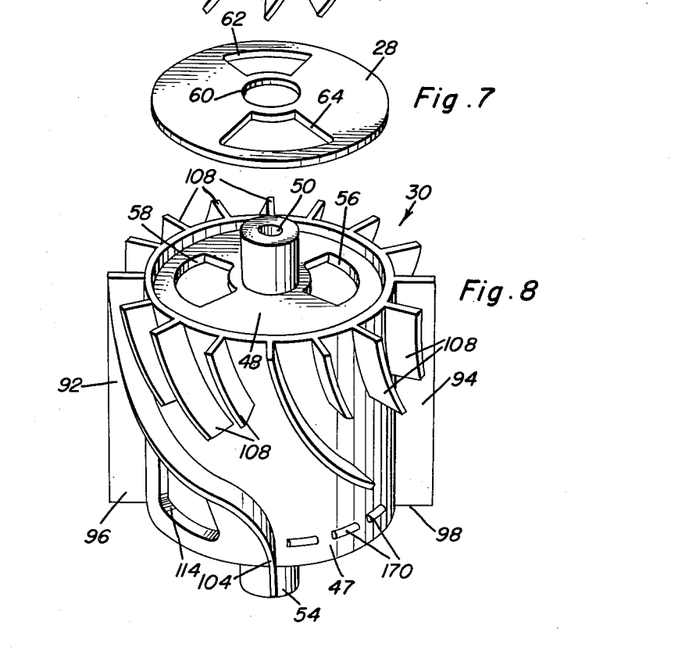
FIGURE 7 is a perspective view of a control valve for producing shock waves or hammer waves in the fluid pressure medium.
FIGURE 8 is a perspective view of the turbine rotor forming both a rotating and a distributing means for the pulsating fluid pressure.

The components of the device further include a control valve 28, shown in FIGURE 7; and a freely rotatable combined turbine rotor and rotary distributor 30 disclosed in FIGURE 8. Below the turbine rotor there is provided a high frequency wave generator 32, see FIGURE 9, and a stationary distributing and diffusing vane assembly 34 of the construction shown in FIGURE 10. The stationary distributor 34 is mounted upon a stationary supporting arbor or mandrel 36 rising from a supporting base 38 removably secured and sealed to the side of the well bore 12 as by a conventional packer assembly 40 operated by any conventional means (not shown).

*Rotary Distributor and Turbine Assembly*

The rotary distributor and turbine assembly includes the members 20, 24, 28, 30, 32 and 34. Referring first to FIGURES 1, 3 and 6, it will be observed that the inner cylindrical casing or sleeve 24 is provided upon its exterior surface with a plurality of curved ribs, fins or vanes 42. These vanes each extend radially outwardly from the sleeve forming the body portion of the member 24, but are spirally curved along their longitudinal extent upon the sleeve, and are given such a contour and shape as will serve to direct the downwardly flowing stream of pressure fluid to discharge the same at the most effective angle and to the best advantage against the turbine rotor blades of the turbine rotor 30 and thus impart rotation thereto. The vanes 42 extend outwardly from the central sleeve member 24 through the annular chamber 26 and into either closely spaced relation with respect to the wall of the member 20; or preferably into secure and fixed engagement therewith. In any event, as will be apparent from FIGURE 3, the vanes 42 serve to divide the annular chamber 26 into a plurality of circumferentially spaced passages, the curving contour of the vanes 42 serving to direct the flow of these passages at a predetermined angular relation with respect to the vertical central axis of the device.

Across the bottom end of the sleeve 24, as shown more clearly in FIGURE 1 and in FIGURE 3, there is provided a diametrically disposed plate or spider 44 having a circular enlarged upwardly extending tubular boss 46.

Figure 2:
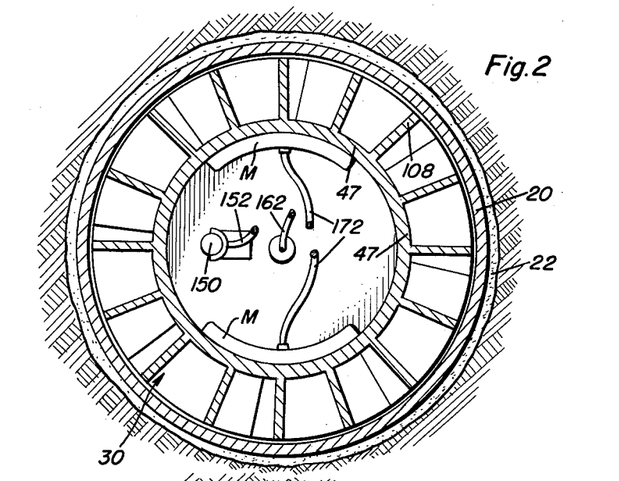
FIGURE 2 is a horizontal sectional view taken substantially upon the plane indicated by the section line 2—2 of FIGURE 1 and showing in particular the internal construction of the turbine rotor forming a distributor of the pressure fluid in accordance with this invention.

Attention is now directed more specifically to FIGURES 1, 2 and 8 for a consideration of the freely rotating turbine rotor and rotary distributor 30. This member consists of a hollow, sleeve or cylindrical body 47 having a flat circular or top wall 48 which however is downwardly recessed with regard to the upper end of the body 47 to receive the control valve 28 as set forth hereinafter. Extending axially upwardly from this top wall is a cylindrical boss comprising a bearing member 50 which is journalled in the above mentioned axially depending tubular boss 46 of the member 24. At its lower end, the cylindrical body 47 has its central portion closed as by the circular bottom wall 52 and a further cylindrical boss constituting a bearing 54 projects axially downwardly therefrom for journalling in a manner to be subsequently set forth.

The top wall 48, see FIGURE 8, is provided with a pair of arcuately extending fluid return ports or passages 56 and 58, each extending preferably through substantially 90° of the circumference of the top wall and being oppositely disposed thereon. The previously mentioned valve member 28, see FIGURE 7, is preferably in the form of a circular disk and is provided with a central aperture 60 which is rotatably journaled upon the bearing projection 50, when the disk 28 is seated in the recess in the upper end of the cylindrical body 47 and is rotatably disposed upon the recessed top wall 48. By means of the vertical upper and lower journals 50 and 54, seated in the stationary bearings 46 and 76, the member 30 is mounted for free rotation about its vertical axis.

The valve disk is also provided with a pair of ports 62 and 64 which are oppositely disposed upon the valve disk and each of which also extends through 90° of the circumference of the disk, these ports being complementary to the ports 56 and 58 previously mentioned. The arrangement and proportions are such that as shown in FIGURE 1, in the assembled position of the turbine rotor and the diffuser vane assembly, the valve disk is snugly rotatably received between the spider 44 and the top wall 48.

The valve disk 28 and the top wall 48 constituting a valve seat cooperate as a valve assembly. During normal operation of the apparatus, the valve disk rotates as a unit with the turbine rotor 30, the ports 62 and 64 remaining in registry with the ports 56 and 58. This places the space within the cylindrical body 47 in constant communication with the interior of the body 24 and the fluid return tubing 18. However, as set forth hereinafter, means are provided whereby the valve disk 28 may be locked to the stationary body 24 through the spider 44 to periodically interrupt the return flow of the fluid medium and thus produce a "water hammer" or violent shock waves in the fluid medium.

The base 38 preferably consists of a flattened drum of any suitable material or construction, and is provided with a circumferentially disposed packer 40 which may be of any known and conventional construction and is adapted to be expanded outwardly against the wall of the well bore 12 by any conventional means (not shown), for anchoring the base in place. Rising centrally from the base is a hollow conical arbor or mandrel 36 which as shown in FIGURE 1 is open at its upper end. Secured in any suitable manner to the exterior conical surface of the mandrel is a conical sleeve 70 of rubber or other suitable cushioning material.

The stationary distributor vane assembly 34 is fixedly secured upon the mandrel. This assembly, see FIGURES 1, 4 and 10, consists of a conical wall 72 of a shape and size to be snugly and tightly fitted upon the cushioning sleeve 70 when the distributor assembly is pressed downwardly upon the mandrel in the manner shown in FIGURE 1. At its upper end, the conical wall 72 is provided with a circular closure disk 74 which has a centrally disposed cup-shaped recess 76 therein. This recess rotatably receives and journals the above mentioned lower cylindrical bearing 54 of the rotor 30. The conical wall 72 is provided with a plurality of vertically extending slots 78, see FIGURE 4, extending from the bottom of the wall 72 upwardly a sufficient distance to impart radial resiliency to the wall to thus permit the same to be frictionally clamped and pressed upon the mandrel. Ribs, vanes or fins 80 extend radially from the side wall 72 along substantially the entire vertical height of the same, and these ribs are of such size as to be pressed into the wall of the well bore 12 when the assembly is expanded radially outwardly as it is pressed downwardly upon the mandrel in the manner shown in FIGURE 1. Thus, the ribs or fins 80, being pressed into the wall of the formation establish a sealing engagement which assists in preventing rotation of the assembly 34 and which also prevents flow of fluid circumferentially of the member 34 between the vertical channels formed between adjacent ribs 80.

Figure 10:
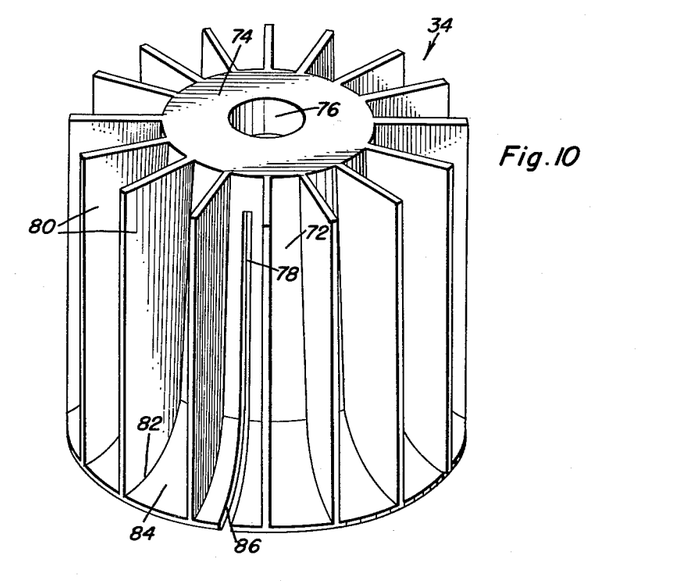
FIGURE 10 is a perspective view of the stationary pressure fluid distributor vane assembly for directing fluid from the turbine rotor and distributor into the formation.

As shown in FIGURE 10 at their lower ends the ribs 80 are provided with curved edges 82 and correspondingly curved bottom walls or webs 84 are joined to these edges and are pressed into the wall of the well bore. The contour of the bottom walls 84 is such that the fluid pressure medium discharged downwardly between adjacent fins or ribs 80 will be deflected and curved outwardly against the face of the formation through which the well bore extends. It will be observed that the bottom walls 84 have slots 86 constituting extension of the slots 78 previously mentioned.

Disposed at equal angular intervals about the circumference of the wall of the cylindrical body 47 are a plurality of turbine vanes of specific contours and disposition as set forth hereinafter. These vanes have their upper ends terminating flush with the top wall of the rotor, as will be apparent from FIGURE 8. At their upper ends, these vanes are so disposed that they will register exactly with the lower ends of the stationary diffuser vanes 42 of the member 24. This arrangement is such that the fluid will be directed by the lower ends of the vanes 42 in a direction to most effectively impact upon the upper ends of the rotor vanes. Thus, in the usual manner with turbines, the fluid medium under pressure will be directed against a rotor vane so as to impart rotation thereto.

However, although the plurality of streams of fluid from the vanes 42, and which are fed thereto by the annular passage 26, are delivered to the upper portion of the turbine rotor around the entire circumference of the same, in a continuous manner, this fluid is discharged at the lower end of the same from only two diametrically opposite quadrant sectors of the rotor. To effect this function, the plurality of vanes are given such a curvature that the fluid received around the entire circumference of the upper portion of the rotor is caused to converge and be divided and discharged from two oppositely disposed quadrants at the lower surface of the same.

Figure 5:
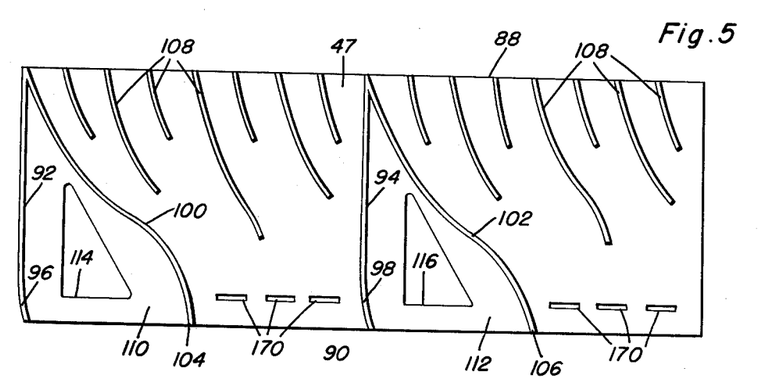
FIGURE 5 is an elevational development view of the exterior construction of the turbine rotor in order to show more clearly the particular and novel arrangement of the fins or vanes thereon.

Referring to FIGURE 5, it will be seen that the upper edge of the turbine rotor in the development view therein, has been indicated by the numeral 88, while the lower edge is indicated at 90. Upon opposite sides of the cylindrical surface of the body 47 there are provided a pair of substantially vertical or axially extending vanes 92 and 94 which extend from top to bottom of the rotor, and their lower ends may be slightly curved as at 96 and 98 to improve fluid flow. Also starting from the upper ends of the vanes 92 and 94 are a pair of curved dividing vanes 100 and 102 whose lower ends intersect the bottom edge 90 of the rotor at the points 104 and 106, these points being equidistantly spaced between the previously mentioned vertical ribs or vanes 96 and 98. Thus, the lower edge of the turbine rotor is divided into four equal portions or quadrants, while the upper edge is divided into two equal portions by the lower and upper ends respectively of the vanes 92, 94, 100 and 102. As so far described, it will now be apparent that the fluid passing about one-half of the entire circumference of the upper portion of the turbine is discharged into the oppositely disposed quadrants at the lower portion of the turbine, these quadrants lying between the vanes 100 and 94 and 102 and 92, respectively. Thus, there is no down flowing fluid in the two triangular shaped quadrant sectors of the rotor circumference which are bounded by the vanes 92 and 100 and the vanes 94 and 102.

Disposed between the vanes 100 and 94 and the vanes 102 and 92 are a plurality of intermediate rotor blades 108 each of an appropriate contour for proportioning and directing the fluid flow passing between their respective guiding and directing vanes 100 and 94; and 102 and 92. These intermediate vanes will of course be of the size, shape and contour for most efficiently performing the customary functions of turbine blades.

From a study of FIGURES 5 and 8 it will be seen that the wedge-shaped or triangular segments lying between the vanes 92 and 100 and the vanes 94 and 102, and identified by the numeral 110 and 112 are sealed off from the downward flow of the fluid medium passing through the turbine rotor. These triangular spaces are provided with triangular shaped openings or ports 114 and 116 which are closed from the top of the rotor but are open to the bottom thereof and which serve to admit the return flow of the fluid medium, as set forth hereinafter, into the interior of the cylindrical body 47 whence it passes, as previously described, through the device and into the return tubing 18.

As so far described, it will now be seen that two diametrically disposed quadrants upon the lower surface of the rotor continuously deliver the fluid medium downwardly through the rotor and into the stationary distributor vane assembly 34; while the other two oppositely disposed quadrants 110 and 112 constitute a return means for the fluid previously delivered to the member 34.

Figure 4:
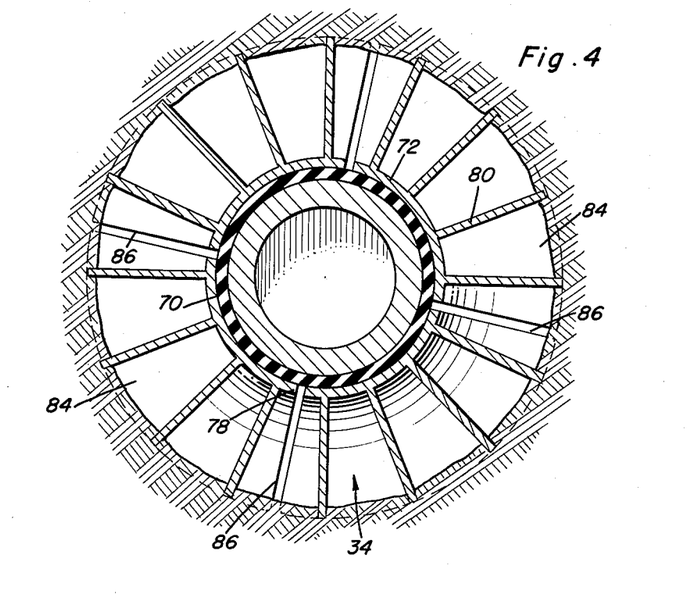
FIGURE 4 is a horizontal sectional view taken substantially upon the plane indicated by the section line 4—4 of FIGURE 1 and illustrating in particular the construction and the mounting of the stationary distributor vane assembly for applying the pulsating fluid pressure to a formation.

As will be apparent from FIGURES 4 and 10, the stationary distributing vane assembly 34 has the same number of vertical vanes 80 as there are vanes 42 in the sleeve 24 and as there are vanes upon the rotor 30. Thus, there is a continuous, although reversely curving passage starting at the top of the vanes 42 and ending at the bottom portion of the vanes 80 whereby the fluid medium after passing through the turbine rotor is fed or delivered in the same number of streams at which it entered the upper stationary diffuser vane assembly, against the formation in the well bore. However, in view of the distributing function of the rotor, these fluid streams are temporarily laterally displaced as they pass through the rotor.

It will now be apparent that at a given moment, the entire fluid intake of the turbine rotor is discharged into two quadrants, each of 90° circumferential extent, from the vanes 80 of the vane assembly 34; and that as the rotor turns, these quadrants whereby the fluid is applied under pressure to the formation, rotate or progress around the well bore. Thus, for each 90° rotation of the rotor, it will be seen that two quadrants are pressurizing the formation, while the other two quadrants are relieving the pressure previously applied to the formation; and this action progresses circumferentially and in alteration as the rotor turns. By this means, the fluid pressure medium is caused to impart periodic alternate applications of pressure to and withdrawals of pressure from the formation in a continuing sequence. Thus, the pressure medium is caused to impart a pulsating pressure effect to a formation which has been found to be highly efficacious in aiding the secondary recovery of oil therefrom; introducing by these pulsations an energy transmitting high frequency wave in the medium in the formation which wave in itself penetrates into the formation and releases its energy in the form of heat of physical impulses.

*Hammer Valve Assembly*

As shown in FIGURES 1 and 3, the spider 44 has mounted thereon a fluid pressure operated device 130 which is preferably in the form of a cylinder and to which fluid pressure is applied as by a pipe or conduit 132 which may extend through the string of tubing 18. Movable within the cylinder 130 is a fluid pressure actuated member, such a plunger, diaphragm or the like, not shown, and which extends through a corresponding opening in the spider 44 whereby the same may be caused by the application of fluid pressure to frictionally engage the upper surface of the valve disk 28. Since the fluid pressure actuated device is of any one of a number of conventional and known types, a detailed description of the same is deemed to be unnecessary for the purposes of understanding the principles of this invention. Alternatively, any other type of latch means may be employed to selectively hold the valve disk against rotation, the invention not being limited to any particular construction for this purpose.

In operation, the valve disk normally rotates with the cylindrical body 47 as previously set forth. It is contemplated that the flow of fluid through the aligned ports or apertures in the valve disk and the top wall 48 of the cylindrical body will assist in keeping the ports aligned and causing the valve disk to rotate with the body. However, when a pressure is applied through the conduit 132 to the actuator 130, the frictional engagement of the actuator upon the valve disk will either completely stop further rotation of the valve disk; or will retard the rotation of the same relative to the rotation of the cylindrical body 47. When the disk is completely stopped, it is evident that each rotation of the body 47 will intermittently interrupt the return flow of the fluid medium. This interruption will result in a hammer shock as the moving medium is suddenly halted in its motion. This hammer shock will result in high frequency shock waves being set up in the fluid medium, and through the fluid medium being imparted to the formation contacted by the same.

It will be evident that the force applied in this hammer shock may be graduated or regulated by varying the speed at which the ports in the valve assembly are closed, and this variation is of course effected by the frictional drag applied to the valve disk through the pressure operated device 130. Thus, this arrangement provides a means for imparting controllable hammer shock waves or high frequency vibrations to the fluid medium, as desired.

*High Frequency Wave Generator*

Figure 9:
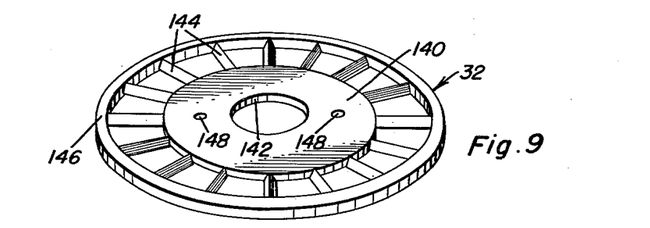
FIGURE 9 is a perspective view of a high frequency wave generating means forming an element of the invention.
Figure 11:
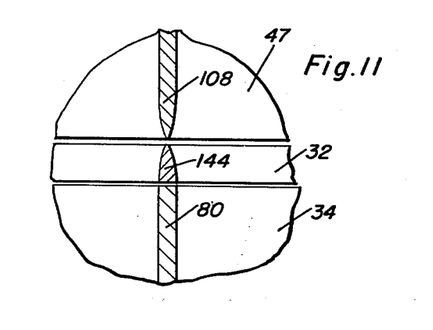
FIGURE 11 is a detail view taken upon an enlarged scale in vertical section substantially upon the plane indicated by the section line 11—11 of FIGURE 1.

Reference is next made to FIGURES 1, 9 and 11 for an understanding of a high frequency wave generating device which forms a part of the apparatus and which may be selectively placed into or out of operation.

The member 32 consists of a circular disk provided with a circular central portion or hub 140 which is apertured, as at 142. The hub 140 rests upon the top wall 74 of the member 34 with the aperture 142 surrounding the bearing 54 of the turbine rotor.

A plurality of radially extending vanes or blades 144 radiate from the hub portion 140 and constitute spokes which support the annular rim 146. The latter is received within the lower end of the skirt portion of the member 20 and has a snug rotating fit therein.

The blades or spokes 144 are preferably V-shaped in cross section with their apex at the top and with their sides downwardly diverging, as clearly shown in FIGURE 9 and in FIGURE 11. The blades or spokes 144 are of sufficient length to extend substantially entirely across the annular passage lying between the external surface of the cylindrical wall of the body 47 and the internal cylindrical surface of the member 20, and thus extend across the downwardly flowing stream of the fluid medium.

If desired, the undersurface of the spokes could also be provided with a downwardly directed knife edge similar to the upwardly directed knife edge just described, whereby the returning or upflowing stream of fluid would encounter the knife edges during its upward flow.

As will be seen from FIGURE 1, the hub portion 140 is rotatably received between the bottom wall 52 of the body 47 and the top wall 74 of the element 34. Means are provided for selectively locking the generator 32 to the top wall 74 or to the bottom wall 52. This means preferably comprises one or more detents or recesses 148, see FIGURE 9, in the upper surface of the hub 140, and similar recesses in the lower surface of the same. Suitably mounted within the interior of the cylindrical body 47 is a fluid pressure actuated device 150 to which fluid pressure is supplied as by a conduit 152. Forming a part of the device 150 is a vertically reciprocable plunger 154 which upon downward movement is adapted to engage the detent or locking ball 156 and press the same downwardly through an opening in the bottom wall 52 into one of the locking detents 148 to thereby lock or latch the hub 140 to the bottom wall 52 for rotation with the turbine rotor. When locked in this position, the spaces between the blades 144 will register with the spaces or passages between the turbine blades and thus there will be no relative rotation between the blades 144 and the turbine blades or vanes.

Suitably mounted within the hollow mandrel or arbor 36 is a pressure actuated device 158 similar to the device 150 and which likewise actuates a locking ball 160 to engage the locking detents from the underside of the hub 140. Fluid pressure is supplied to the actuator 158 by means of a conduit 162. The two conduits extend through swivel connections of any conventional character and which are disposed axially of the bearing member 50, while the conduit 162 also extends through similar swivelling connections in the bearing member 54. The two conduits may conveniently be disposed for passage up the string of tubing 18 whereby the three conduits 132, 152 and 162 may be connected to any suitable fluid pressure source and pressure control means disposed at the surface of the well bore.

This arrangement is such that the pressure actuated devices 150 and 158 may be selectively energized to selectively lock the wave generating member 32 to the turbine rotor 30 for rotation therewith as a unit; or to the stationary member 34. When rotating with the turbine rotor 30, the wave generator may be considered to be in its inoperative or inactive position, since there is no affect upon the flow of fluid either upwardly or downwardly through the same. However, when the generator is locked to the stationary vane assembly 34, the relative rotation of the fluid discharged by or passing into the turbine rotor will move across the knife edges of the members 144 and thus will have imparted thereto a high frequency vibratory motion. It will be observed that when locked to the member 34, the blades 144 will be in line with the blades 80, while when locked to the turbine rotor, they will be in line with the vanes 108. Thus, the high frequency wave generating device 32 may be selectively rendered operative or inoperative as desired, and thus constitutes a means for imposing additional high frequency vibrations upon the fluid medium passing through the apparatus.

*Introduction of Gases*

Provision is also made for more effectively introducing gases into the pressure medium for the treatment of formations, vapor lift and other purposes in accordance with conventional practice. While gases such as carbon dioxide or volatile liquifiable gases may be introduced into the fluid pressure medium before the same is supplied to the diffuser vane assembly 24, it is preferred to provide a gas introducing means associated with the turbine rotor and distributor 30.

For this purpose a plurality of gas discharge slots 170, see FIGURE 5, are provided in the lower portion of the wall of the cylindrical body 47, between the vanes 104 and 98 and between the vanes 102 and 92. The slots 170 extend circumferentially of the distributor and lie in those quadrants through which the pressure medium is flowing towards the formation, whereby the introduced gases will be carried and applied to the formation by the pressure medium.

In order to supply the gases to be inducted to the slots 170 a manifold M internally communicates with the slots 170 in each quadrant and has connected thereto a suitable conduit or passage system 172 which is mechanically associated with the device in the same manner as the previously described fluid pressure conduits 132, 152 and 162.

*Operation*

The embodiment of the apparatus disclosed in FIGURES 1–11 is capable of three important different modes of operation. First, it may be employed as a means for circulating a fluid pressure medium and for applying fluid pressure pulsations and high frequency wave impulses thereon for treating a formation; second, it may be positioned in a flowing well whereby the formation pressure will constitute the driving means for operating the device and producing fluid pressure pulsations for treating the formation; and third, it may be used in a flowing well for applying to a formation under pressure a diluting medium to facilitate the recovery of oil from the formation; or to apply gases for treating the formation, or for a vapor lift to assist in the pumping of oil from the well bore. These three different modes of operation will now be considered in the order mentioned above.

*Operation of the Apparatus for Circulating a Pulsating Fluid Pressure Medium*

When it is desired to apply pulsating fluid pressures and/or gases for treating a formation, the device of FIGURES 1–11 is lowered into a well bore into position adjacent the desired portion of a formation which it is desired to treat with the apparatus, and the base 38 is securely locked in place by expanding the packing 40 in a conventional manner. Then the rest of the device is lowered upon this base, the stationary distributing vane assembly 34 being in its radially collapsed position and is lowered down upon the mandrel, and during this lowering movement is radially outwardly expanded until the vanes 80 are pressed into the wall of the bore. Then the packer 22 is expanded by fluid under pressure flowing through tubing 16 and the apparatus is thus secured in place ready for use.

A fluid pressure with which the formation is to be treated is then applied under pressure through the tubing 16 and enters the annular chamber 26. From thence, as set forth in detail in the foregoing description, this fluid passes through the diffuser vanes 42 and is discharged into the upper ends of the turbine vanes 100, 102, and 108 of the turbine rotor and distributor 47. After it passes through the latter, the fluid, either alone or with a gaseous or other treating medium supplied through the slots 170 from the conduit 172, passes downwardly into portions of the vanes 80 of the stationary distributing assembly, and from thence are applied to two circumferential oppositely disposed quadrants positioned opposite the space between vanes 100 and 94, and between vanes 102 and 92 of the formation for producing an increase in pressure therein. At the same time, the intermediate two quadrant sections of the formation are connected through the vane assembly to the two quadrant sections 110 and 112 of the rotor body and by means of the ports 114 and 116 permits fluid to flow through the interior of this body and upwardly through the registering ports of the valve assembly members. The fluid then flows upwardly through the tubing 18 to the pumping means by which the fluid is circulated. As the turbine rotor is rotated, alternating regions of pressure impulses and pressure release are applied in sequence to the formation thus producing a pulsating pressure upon the same.

During the above described operation, the high frequency wave generator 32 has been considered to be in its inoperative position, during which it has no effect upon the flow of the fluid medium into or out of the device. However, by actuation of the fluid pressure actuators 150 and 158, the rigid locking of the wave generator 32 to the turbine rotor is released and the generator is locked to the stationary distributing vane assembly 34. When this occurs, the relative rotation of the turbine rotor with respect to the now stationary wave generator 32 causes the sharp edges of the blades 144 of the latter to impart a high frequency vibration to the fluid pressure medium passing through the generator. Thus, high frequency waves are imparted to the formation.

In addition to the selective application of a high frequency wave to the fluid pressure medium, the apparatus may also function to impart a hammer shock wave thereto. For that purpose, the valve mechanism 28 is either quickly or slowly closed by the mechanism 130 described hereinbefore, causing either an abrupt or a more gradual stoppage of the upward flow of the fluid medium from the well bore, thereby resulting in the generation of a hammer shock wave therein. This latter wave is of course generated at a frequency proportional to the speed of rotation of the turbine rotor.

*Operation of the Device by Formation Pressure of a Flowing Well*

In the second mode of operation of the apparatus, the pressure impulses applied to the formation are produced by the formation pressure itself of a flowing well and not by a circulating of a fluid pressure medium.

In this arrangement and operation fluids from the formation under the formation pressure flow from the stationary vane assembly 34 upwardly through the turbine rotor vane assembly and outwardly through the diffuser vanes 42. During this flow the valve assembly 28 is closed, the valve actuator 130 being of such character as to enable the valve plate to be fixedly latched or secured to the top wall 48 of the cylindrical body 47 with a valve port out of registry with each other. As the formation fluids flow upwardly under the formation pressure, it is obvious that the turbine rotor will rotate in an opposite direction from that previously described, with the rotor quadrants between the vanes 194 and the vanes 102 and 92 permitting passage of this fluid and causing rotation of the turbine rotor. With the valve assembly 28 closed, flow through the wedge shape quadrants 110, 112 of the rotor is prevented. Thus, the fluid flowing from the formation and into the device is alternately withdrawn and stopped as successive quadrants pass the same region of the formation, thus producing a pulsing effect upon the pressure prevailing in the formation in that region. This pulsation is employed to treat the formation in the same manner as the pulsation produced in the previously described operation of the device.

In this mode of operation, gases may be introduced to ports 170 to constitute a vapor lift assisting in the flowing of the fluids from the well bore.

Additional hammer shockwaves may be produced by intermittently allowing the valve assembly ports to open and close, thereby intermittently applying pressure from the formation for producing a flow, which upon being abruptly curtailed will produce a hammer shock wave or waves in the flowing formation fluids and thereby in the formation.

*Operation of the Device for Introducing Fluids in a Flowing Well*

The third mode of operation is similar to that manner of operation immediately hereinbefore, but further contemplates the application of gases or fluids under pressure through the tubing 18 and past the valve assembly 28 for application to the formation through the ports 114 and 116 during the rotation of the device. These fluids upon pressuring the formation may be vented or released upon the registration of the succeeding quadrant of the turbine rotor with the vanes 80, either producing thereby pulsating pressures in the formation; operating as a vapor lift to assist in flowing formation fluids from the well bore through the tubing 16; or assisting the formation pressures in withdrawing fluid from the well bore. As in the preceding embodiments, the high frequency generator 32 may be selectively utilized or rendered idle; and the hammer shock action may be selectively intermittently applied through manipulation of the valve assembly as previously set forth.

Figure 12:
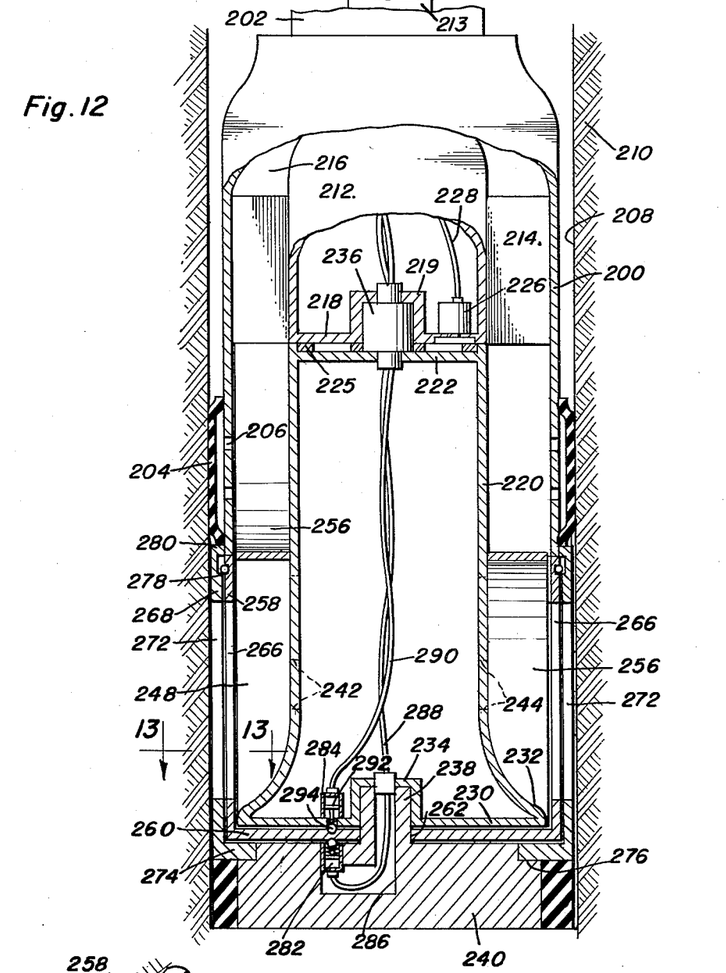
FIGURE 12 is a vertical sectional view through a modified apparatus.
Figure 13:
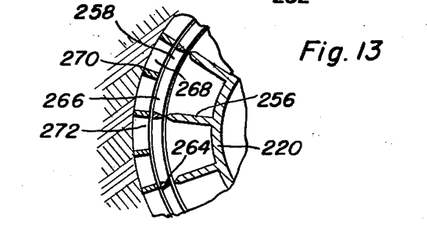
FIGURE 13 is a horizontal sectional detail view taken substantially upon the plane indicated by the section line 13—13 of FIGURE 12.
Figure 14:
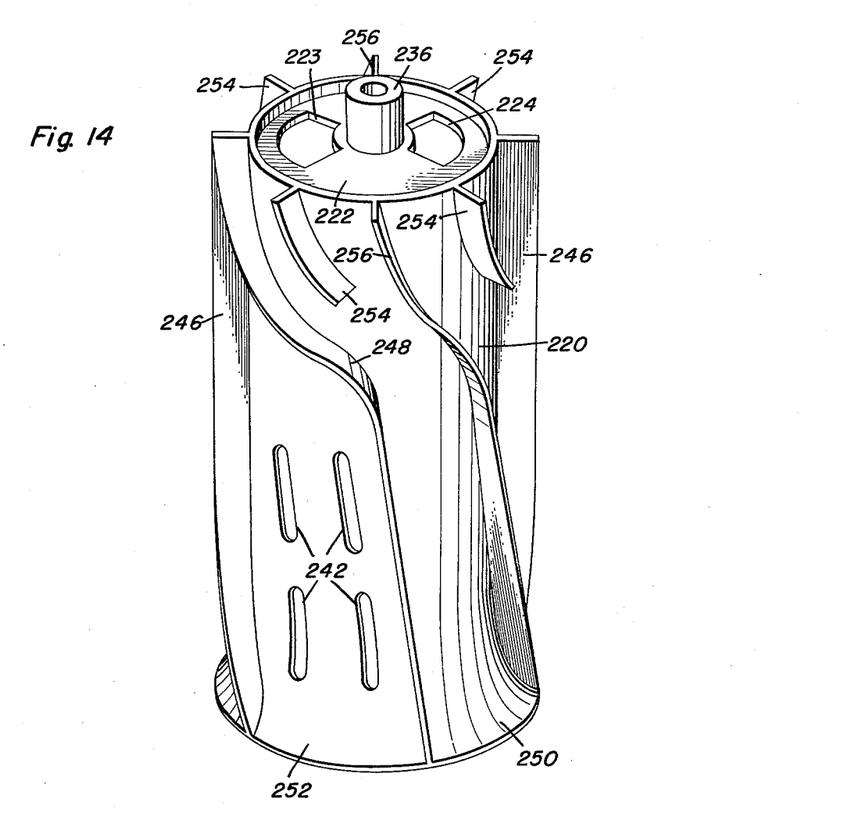
FIGURE 14 is a perspective view of the combined turbine rotor distributor and diffuser vane assembly of the embodiment of FIGURE 12.

*Embodiments of FIGURES 12–14*

FIGURES 12–14 illustrate another construction in accordance with the principles of this invention. In this modification, there is disclosed a hollow cylindrical body or casing 200 having its upper end reduced in diameter and detachably secured to the lower end of a tubing 202. Adjacent its lower portion and surrounding the same is a conventional packer 204 which is laterally expanded by a fluid medium under pressure flowing from the interior of the body 200 through the ports 206, into a tight anchoring engagement with the wall of a well bore 208 in a formation 210 which it is desired to treat with this apparatus.

Disposed centrally within the body 200 is an inner casing or body 212, having its upper end in communication with the interior of a tubing 213, to which it is detachably connected, and which is received within the tubing 202. The inner body 212 constitutes part of a stationary diffuser vane assembly having a plurality of outwardly extending diffuser vanes or blades 214 of any desired character, which project across the annular passage 216 between the members 212 and 200 and are secured thereto. Diametrically extending across the bottom of the inner body is a bridge or spider 218 having a centrally disposed bearing housing 219.

As so far described, the above set forth structure is substantially identical with that of the embodiment of FIGURES 1–11. However, in this arrangement, the turbine rotor and distributor and the lower diffuser vane assembly have been replaced by a modified construction.

Referring now to FIGURES 12 and 14 it will be seen that this modified construction includes a cylindrical, hollow rotor body 220, preferably of the same diameter as the body 212 and disposed therebeneath in axial alignment therewith. At its upper end the body 220 has a top closure wall 222, recessed in the upper end of the body 220 and having oppositely disposed valve ports 223 and 224. A disk valve 225 is rotatably received upon the recessed top wall 222, and constitutes therewith a valve assembly which is identical with that of the preceding embodiment. There is also provided a similar valve control member 226 supplied with an actuating means such as fluid under pressure by the conduit 228, these members being also identical with the members 130 and 132.

At its lower end, a wall 230 closes the outwardly flaring lower end 232 of the body 220, being provided with an upwardly dished, cup-shaped bearing housing 234. Rising axially from the top wall 222 is a cylindrical projection 236 comprising a bearing received in the bearing housing 219 whereby the upper end of the body 220 is mounted for rotation. The lower end is journaled by its bearing housing 234 being rotatable upon an upstanding hollow cylindrical bearing 238 projecting from the base 240.

Sets of vertically spaced ports 242, see FIGURE 14, and 244 on diametrically opposite sides of the body 220 provide communication with its interior. Upon its exterior the rotor body 220 has a blade or vane assembly of vanes, inclined in the manner shown in FIGURE 18, and which combines the structure and functions of the rotor vanes and the lower stationary diffuser vane of the previous embodiment.

The upper portion of the assembly of vanes 246, 248, 254 comprise the blades of the turbine rotor and function to impart rotation to the rotor body 220. These upper vane portions are disposed equally about the circumference of the rotor are equal in number to the vanes 214 of the upper diffuser assembly and are shaped in accordance with conventional practice in the design of turbine blades for having a rotative impulse imparted thereto by the passage of a fluid medium from the tubing 202, through the annular passage 216 and the diffuser vanes 214 and down about the exterior surface of the rotor 220.

Figure 18:
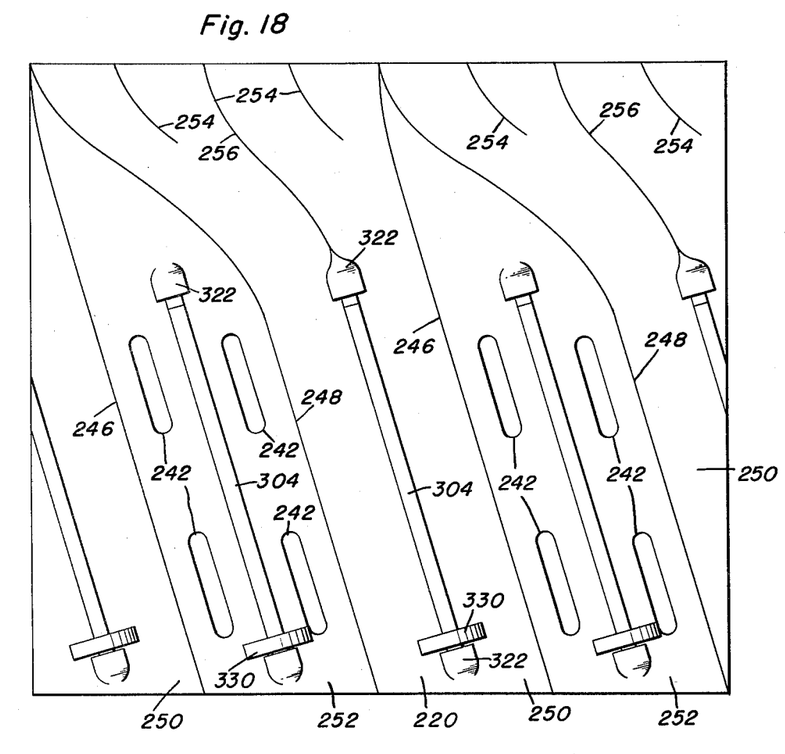
FIGURE 18 is a plan development view of the circumference of the turbine rotor, distributor and diffuser vane assembly of the embodiment of FIGURE 15.

In the same manner as shown in the development view of FIGURE 18, and as shown in FIGURE 14, the vane arrangement is such that the fluid medium received between the upper ends of the vanes about the entire periphery of the rotor is segregated and discharged from between two oppositely disposed quadrants at the lower end thereof. The other two opposed quadrants at this bottom end are devoid of vanes in the form of FIGURES 12–14, receiving the returning or up-flowing fluid medium which is discharged therefrom into the interior of the rotor body by the ports 242 and 244, from whence it passes by the valve assembly 222, 223, 224 and 225 into the inner body 212 and its return tubing 213.

In order to effect the above functions, the vanes are arranged in the same general manner and function in the same general way as the turbine blades of the foregoing embodiment, and a detailed description is therefore deemed to be unnecessary. Briefly, each of the fluid return or fluid exhaust quadrants is bounded by a pair of vanes which extend the entire length of the rotor body, these being a relatively straight blade 246 and a curved vane 248 whose upper end merges with that of the blade 246 but whose lower end is spaced approximately 90° therefrom. This arrangement is also employed in the embodiment of FIGURES 15–18 being more clearly shown in the plan development view of FIGURE 18. These pairs of vanes divide the rotor body surface into four alternate supply or down flow quadrants 250 and return or up flow quadrants 252. In the supply quadrants are disposed intermediate vanes, some short as at 254 and other full length as at 256.

The lower portions of the vanes of the supply quadrants 250 perform the same functions as the vanes of the lower diffuser vane assembly 34 previously described, in that they deliver the fluid medium against the wall of the formation, as the rotor revolves. This fluid under pressure, is intermittently applied by the alternate supply quadrants 250 as the rotor turns, thus imparting pulsations or intermittent pressure increases progessively to the formation. The pressure increases are intermittently released as the succeeding return quadrants 252 effect a release or withdrawal of the fluid. Thus, high and low pressure fluid pulsations are intermittently applied to the formation for treating the same in the manner set forth hereinbefore.

In some instances, the foregoing structure will be found sufficient for beneficially treating a formation to facilitate secondary recovery of oil therefrom. However, it is preferred to provide a high frequency wave generator which may be selectively placed into operation for increasing or providing additional high frequency pressure impulses or energy waves in the fluid medium. This generator serves the same general purposes of the generator 32 previously described. In this form of the invention, it consists of a cylindrical body 258 having a closed bottom wall 260 which is apertured at 262 for rotatable journalling on the bearing 238. The cylindrical wall has alternate vertically extending ribs or blades 264, see FIGURE 13, and slots 266, the former having outwardly directed knife edges.

A cylindrical grating 268 closely surrounds the generator body 258, having alternate vertical ribs and slots 270 and 272 opposed to the ribs and slots of the generator and having an inturned bottom flange 274 resting on a shoulder 276 of the base 240. The grating is thus supported and held stationary by the base, a bearing assembly 278 being disposed between its upper end and the generator body 258, while the upper end may be secured to the casing 200 as at 280.

The generator body 258 may be selectively locked to the stationary base, whereupon it will be inoperative; or it may be locked to the rotor for rotation therewith, upon which it will be effective to produce high frequency waves in the fluid medium by the passage of its knife edged blades in close proximity to the grating ribs 270 as the fluid medium passes from the blades of the rotor 220 through the slots 266 and 272.

A pair of selectively operable locking members 282 and 284 are provided for engaging opposite sides of the bottom wall 260 to lock the same to the stationary base 240 or the revolving bottom wall 230 of the rotor 220. A cavity 286 in the base 240 communicates with the tubular bearing 238 and with the underside of the wall 260, and a fluid conducting conduit 288 extends into the cavity and is operatively connected to the locking member 282 for actuating the latter. A similar conduit 290 communicates with the locking member 284 which is mounted within the rotor body 220 upon the bottom wall 230 thereof. The cables extend through the interior of the body 220 and through the tubular bearing 236 into the body 212 and from thence up the conduit 213 to the surface of the well bore where they are connected to any suitable pressure source and control means, not shown.

The locking devices are of identical construction and include fluid pressure cylinders having plungers 292 which actuate locking balls 294. The latter are engageable, under the action of the fluid actuated locking plungers in detent recesses in the top and bottom sides of the bottom wall 260 of the generator body.

From the foregoing, it is believed that the construction and operation of this form of the invention will be readily understood and further explanation is deemed unnecessary.

*Embodiment of FIGURES 15–18*

Shown in FIGURES 15–18 is a still further modified construction in accordance with the same general principles as those of FIGURES 1–11, and which also is similar to the arrangement of FIGURES 12–14. A formation 300, having a well bore 302 therein and in which is disposed a modified construction of apparatus for treating the formation is illustrated. The upper portion of this device is identical with that shown in FIGURES 12 and 14, and therefore has been omitted from the drawings. As in the preceding modification, the cylindrical rotor body 220 is provided as shown in FIGURE 18, with a plurality of the inclined turbine rotor vanes 246, 248, 254 and 256. In addition to these fixedly mounted vanes, however, the present embodiment is provided with oppositely disposed pairs of pivoted blades 304 having substantially knife-shaped edges 306. The blades 304 are journaled as by trunnions 308 at their lower ends in suitable bearing recesses 310 disposed upon the bottom wall 312, which latter forms a closure for the lower end of the body 220 of the turbine rotor and rotary distributor combination. The bottom wall also carries a downwardly projecting axial bearing trunnion 314 which is rotatably received in a bearing recess 316 in the supporting base 318 which may be identical with the base 38.

Figure 15:
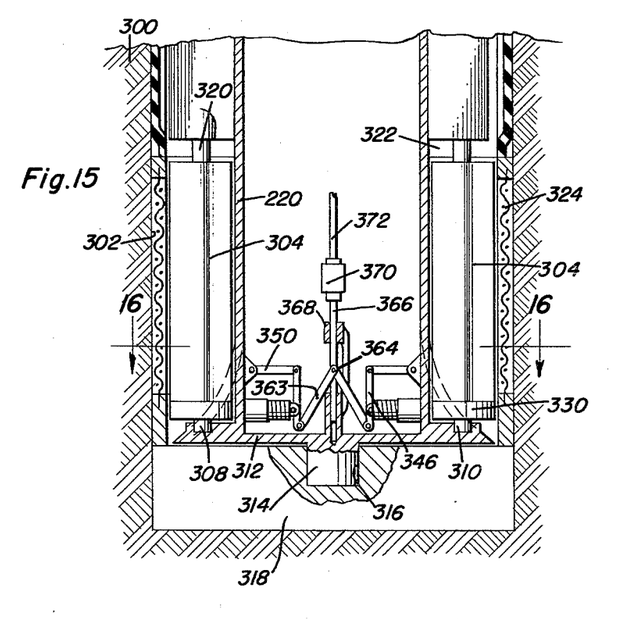
FIGURE 15 is a fragmentary view in vertical section of another modified construction of the rotor, distributor and diffuser assembly.
Figure 16:
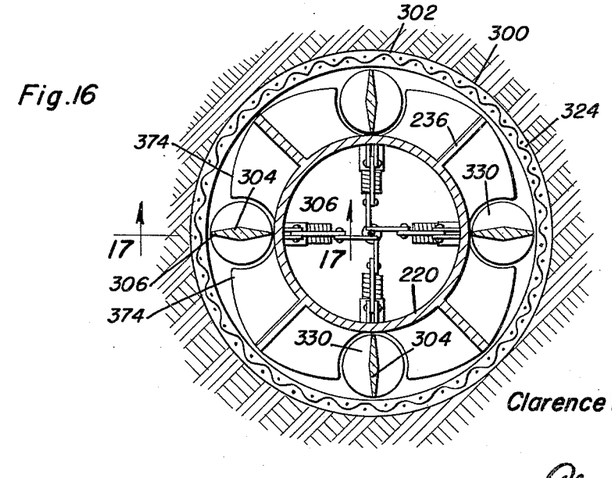
FIGURE 16 is a horizontal sectional view taken substantially upon the plane indicated by the section line 16—16 of FIGURE 15.

At their upper ends, the pivoted vanes 304 are provided with axially upwardly extending pintles 320 which are received in suitable journal bearings formed in projecting lugs or bosses 322 extending from the rotor body 220. If desired, there may be provided a foraminous or reticulated screen 324 which may be interposed between the rotor and the wall of the well bore. Alternatively, this screen may be omitted.

Referring now more particularly to the development plan view of FIGURE 18 it will be seen that the exterior cylindrical surface of the rotor 220 is divided into fluid supply and fluid return quadrants 250 and 252 respectively, by the above mentioned vanes and as set forth in the preceding embodiment. The function of the vanes 246, 248, 254 and 256 is identical with that set forth in connection with the preceding embodiment and therefore is not repeated here. It is also to be understood that the same check valve assembly previously referred to in the two preceding modifications may also be provided, if desired, to impart hammer shock waves to the fluid, and therefore is not repeated here.

The pivoting vanes 304 are preferably, as shown in FIGURE 18 disposed at an inclined angle, the angular disposition serving to direct pulsations upwardly or downwardly, depending upon the nature of the inclination, as set forth hereinafter.

In accordance with this embodiment, the pivoted vanes 304 may be selectively locked in their radial position, whereupon they will function in the same manner as the fixed vanes. Alternatively, they may be released for rotation such rotation being induced by their passage through the medium during the revolution of the rotor body 220, and during their rotation about their axles 308 and 320 the knife edges 306 of the blades will generate high frequency vibrations in the fluid medium. It will be observed that adjacent each of the pivoted vanes 304, the surface of the rotor body 220 is curved or recessed inwardly, as shown at 374. This arrangement permits a relative radially inward flow of the fluid surrounding the rotor across and against the projecting extremities of the vanes 304 to thereby rotate the latter when the vanes are unlocked. It is the passage of the fluid across the blade edges, periodically interrupted by the rotation of the blades which initiates the high frequency vibration in the fluid medium.

Figure 17:
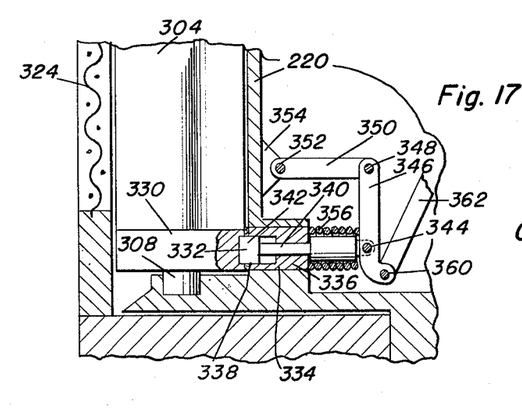
FIGURE 17 is an enlarged detail view of a locking device forming part of the embodiment of FIGURE 15.

It should be noted that the pivoted vanes are mounted in both the supply and return quadrants 250 and 252. In the latter quadrant they may constitute the lower portion or a continuation of the blade 256. In order to effect this selective locking and releasing action, the mechanism shown in FIGURES 14, 15 and 17 is provided.

Adjacent their lower ends each of the pivoting vanes is provided with a circular disk 330 which is provided with a radially disposed depression or recess 332 in the periphery of the same. Disposed within the interior of the body 220 is a bore 334 adjacent each of the pivoted vanes, and a sleeve 336 is slidable in this bore, the sleeve having a face 338 contoured to slidably engage the periphery of the disk 330 and constitute a friction brake therefor. Reciprocable within the sleeve is a plunger 340 having at its inner end a rounded projection or detent 342 adapted to engage and cooperate with the recess 332. The plunger is pivoted at 344 to the mid-portion of a lever 346 having one end fulcrumed as at 348 to a link 350 which is hinged at 352 to a suitable lug 354 upon the wall of the body 220. Surrounding the plunger and abutting against the sleeve 336 and the lever 346 is a compression spring 356 which simultaneously engages the lever and the plunger away from the locking disk 330 of the pivoted vane; and urges the braking sleeve 336 towards frictional engagement with the disk.

The arrangement is such that when the lever 356 is swung towards the locking disk, it will cause the spring to press the locking sleeve 336 into braking engagement with the disk to frictionally grip and retard rotation of the same, and upon further movement will cause the locking projection 342 to engage in locking recess 332 of the locking disk. Thus, the pivoted vanes will be held positively against rotation; and if rotating, they will be frictionally slowed down by the braking sleeve before they are positively stopped and locked by the plunger and its locking projection.

All of the pivoted vanes may be selectively locked and unlocked simultaneously. For this purpose, each of the locking levers 346 is pivotally connected at 360 to a connecting link 363. As shown in FIGURE 14, each of these last mentioned links is in turn pivoted as by pivot pins 364 to a control rod 366 which is slidably received in guides 368 for vertical reciprocation. Any suitable actuating means such as a fluid pressure responsive device 370, supplied with fluid pressure as by a conduit 372 may be provided to cause reciprocation of the control rod 366. When the latter is elevated, the levers will be moved into unlocking position, while when the rod is lowered, the locking action will occur as previously set forth. Alternatively, each pair of the oppositely disposed locking members may be controlled independently.

The operation and functioning of this embodiment is similar to that of FIGURES 12–14 and will be readily apparent from the preceding description.

What is claimed as new is as follows:

1. An apparatus for promoting the secondary recovery of petroleum from an oil bearing formation comprising; a turbine rotor, vanes on said rotor, means for delivering a fluid medium under pressure to said vanes for driving the rotor, and a diffuser vane assembly closely adjacent said rotor for receiving the fluid medium from the rotor vanes and directing it directly against the face of an oil bearing formation.

2. An apparatus for promoting the secondary recovery of petroleum from an oil bearing formation comprising; a turbine rotor, vanes on said rotor, means for delivering a fluid medium under pressure to said vanes for driving the rotor, and a diffuser vane assembly closely adjacent said rotor for receiving the fluid medium from the rotor vanes and directing it directly against the face of an oil bearing formation, said rotor vanes being disposed for receiving the fluid medium around the entire circumference of the rotor and for discharging it from spaced portions of the rotor circumference.

3. The combination of claim 1 including a high frequency wave generator, said generator including a member operatively interposed between said rotor and said diffuser vane assembly for intercepting the flow of the fluid medium therebetween.

4. An apparatus for promoting the secondary recovery of petroleum from an oil bearing formation comprising; a turbine rotor, vanes on said rotor, means for delivering a fluid medium under pressure to said vanes for driving the rotor, a diffuser vane assembly for receiving the fluid medium from the rotor vanes and directing it against the face of an oil bearing formation, a base adapted to be mounted in a well bore in a formation, said base having a mandrel, said diffuser vane assembly being mounted upon said mandrel.

5. The combination of claim 1 wherein said rotor and diffuser vane assembly are integral, a base adapted to support the apparatus in operative association with the face of a formation, means journaling said diffuser vane assembly upon said base.

6. The combination of claim 1 including a high frequency wave generator operatively interposed between the rotor vanes and the formation, said generator comprising a sleeve surrounding said diffuser vane assembly and having alternate slots and blades therein.

7. The combination of claim 1 including a high frequency wave generator operatively interposed between the rotor vanes and the formation, said generator comprising a sleeve surrounding said diffuser vane assembly and having alternate slots and blades therein, said sleeve being rotatable, means to selectively hold said sleeve stationary and to lock said sleeve to said rotor for rotation therewith.

8. The combination of claim 1 including a high frequency wave generator operatively interposed between the rotor vanes and the formation, said generator comprising a sleeve surrounding said diffuser vane assembly and having alternate slots and blades therein, said sleeve having pivoted blades thereon mounted for rotation about their axes upon rotation of said sleeve.

9. The combination of claim 1 including a high frequency wave generaotr operatively interposed between the rotor vanes and the formation, said generator comprising a sleeve surrounding said diffuser vane assembly and having alternate slots and blades therein, said sleeve having pivoted blades thereon mounted for rotation about their axes upon rotation of said sleeve, means for selectively locking said pivoted blades against rotation relative to said sleeve.

10. The combination of claim 1 including a high frequency wave generator operatively interposed between the rotor vanes and the formation, said generator comprising a sleeve surrounding said diffuser vane assembly and having alternate slots and blades therein, said sleeve having pivoted blades thereon mounted for rotation about their axes upon rotation of said sleeve, means for selectively locking said pivoted blades against rotation relative to said sleeve, said last means being operable to control the locking of the pivoted plates in oppositely disposed pairs.

11. The combination of claim 1 including a high frequency wave generator operatively interposed between the rotor vanes and the formation, said generator comprising a sleeve surrounding said diffuser vane assembly and having alternate slots and blades therein, said sleeve having pivoted blades thereon mounted for rotation about their axes upon rotation of said sleeve, said pivoted blades being inclined to the axis of rotation of the rotor.

12. The combination of claim 1 including a high frequency wave generator operatively interposed between the rotor vanes and the formation, said generator comprising a sleeve surrounding said diffuser vane assembly and having alternate slots and blades therein, said sleeve having pivoted blades thereon mounted for rotation about their axes upon rotation of said sleeve, some of said pivoted blades comprising parts of said rotor vanes.

13. The combination of claim 1 wherein the rotor vanes have their upper ends disposed in evenly spaced relation upon the periphery of the rotor and have their lower ends all terminating in spaced portions of the rotor circumference, said rotor having an internal fluid return passage, the periphery of the rotor between the spaced portions having connection with said return passage, said rotor having an internal fluid return passage means establishing connection between said passage and said diffuser vane assembly for return flow of the fluid medium.

14. A process to facilitate the secondary recovery of petroleum from the interstices of an oil bearing formation, comprising; cyclically applying a fluid pressure medium to the face of an oil bearing formation under pressure and withdrawing it under a lower pressure while continuously moving the place of application of the fluid medium to the face of the formation upon said face and thereby apply alternate pressure variations to the individual interstices of the formation in sequence to cause removal of the petroleum from said interstices, including the step of intermittently abruptly interrupting the withdrawal of the medium thereby generating hammer blow shock waves therein for intermittently imparting a greatly increased amplitude to the pulsations in the medium.

References Cited in the file of this patent

UNITED STATES PATENTS

| | | |
|---|---|---|
| Re. 23,381 | Bodine | June 26, 1951 |
| 873,056 | Lake | Dec. 10, 1907 |
| 1,530,221 | Uren | Mar. 17, 1925 |
| 1,658,697 | Wiesman | Feb. 7, 1928 |
| 2,382,685 | Washburn | Aug. 14, 1945 |
| 2,554,005 | Bodine | May 22, 1951 |
| 2,667,932 | Bodine | Feb. 2, 1954 |
| 2,670,801 | Sherborne | Mar. 2, 1954 |
| 2,680,485 | Bodine | June 8, 1954 |
| 2,753,940 | Bonner | July 10, 1956 |